United States Patent
Ito et al.

(10) Patent No.: US 8,012,553 B2
(45) Date of Patent: Sep. 6, 2011

(54) BIODEGRADABLE STRETCH MOLD CONTAINER HAVING EXCELLENT HEAT RESISTANCE

(75) Inventors: Takurou Ito, Yokohama (JP); Hiroki Mori, Yokohama (JP); Hiroaki Sugioka, Yokohama (JP)

(73) Assignee: Toyo Seikan Kaisha, Ltd., Tokyo (JP)

( * ) Notice: Subject to any disclaimer, the term of this patent is extended or adjusted under 35 U.S.C. 154(b) by 470 days.

(21) Appl. No.: 12/303,004

(22) PCT Filed: May 8, 2007

(86) PCT No.: PCT/JP2007/059824
§ 371 (c)(1),
(2), (4) Date: Dec. 1, 2008

(87) PCT Pub. No.: WO2007/138842
PCT Pub. Date: Dec. 6, 2007

(65) Prior Publication Data
US 2009/0186178 A1 Jul. 23, 2009

(30) Foreign Application Priority Data

May 30, 2006 (JP) ................................. 2006-150040
Jul. 13, 2006 (JP) ................................. 2006-192305

(51) Int. Cl.
*B29D 22/00* (2006.01)
*B29D 23/00* (2006.01)
*B32B 1/08* (2006.01)

(52) U.S. Cl. ...................... 428/35.7; 428/34.9; 428/35.1; 428/36.9; 428/36.91; 428/36.92; 264/319; 264/529; 525/186

(58) Field of Classification Search ................ 428/35.7, 428/34.9, 35.1, 36.9, 36.91, 36.92; 264/319, 264/529; 525/186
See application file for complete search history.

(56) References Cited

U.S. PATENT DOCUMENTS

| | | | |
|---|---|---|---|
| 5,424,346 A | 6/1995 | Sinclair | |
| 7,390,543 B2 | 6/2008 | Itoh et al. | |
| 2008/0039579 A1 | 2/2008 | Kimura et al. | |
| 2008/0230954 A1* | 9/2008 | Gruber et al. | ................ 264/319 |

FOREIGN PATENT DOCUMENTS

| | | |
|---|---|---|
| EP | 1674526 A | 6/2006 |
| JP | 2002-201293 A | 7/2002 |
| JP | 2005-200600 A | 7/2005 |
| JP | 2005-255806 A | 9/2005 |
| JP | 2006-036808 A | 2/2006 |
| WO | 03/008178 A1 | 1/2003 |

* cited by examiner

*Primary Examiner* — Michael C Miggins
(74) *Attorney, Agent, or Firm* — Sughrue Mion, PLLC

(57) ABSTRACT

A stretch mold container of the present invention is obtained by draw-forming a resin composition containing a poly-L-lactic acid (A) and a poly-D-lactic acid (B) at a molar ratio A:B in a range of 95:5 to 60:40, and has an amount of heat shrinkage of 5.0% or less under heat treatment conditions of 65° C.×24 hours. Despite of being made from the polylactic acids, the stretch mold container exhibits excellent heat resistance.

7 Claims, 3 Drawing Sheets

SEMICRYSTALLIZATION TIME OF POLYLACTIC ACID
RESIN COMPOSITION (min)
● : POLY-L-LACTIC ACID(d%=1.5%)
△ : PLLA:PDLA=90:10(ARTICLE INJECTION-MOLDED AT 240°C)
□ : PLLA:PDLA=90:10(ARTICLE INJECTION-MOLDED AT 220°C)
■ : PET(POLYETHYLENE TEREPHTHLATE)

SEMICRYSTALLIZATION TIME OF POLYLACTIC ACID
RESIN COMPOSITION (min)

● : POLY-L-LACTIC ACID (d%=1.5%)
△ : PLLA:PDLA=90:10 (ARTICLE INJECTION-MOLDED AT 240°C)
□ : PLLA:PDLA=90:10 (ARTICLE INJECTION-MOLDED AT 220°C)
■ : PET (POLYETHYLENE TEREPHTHLATE)

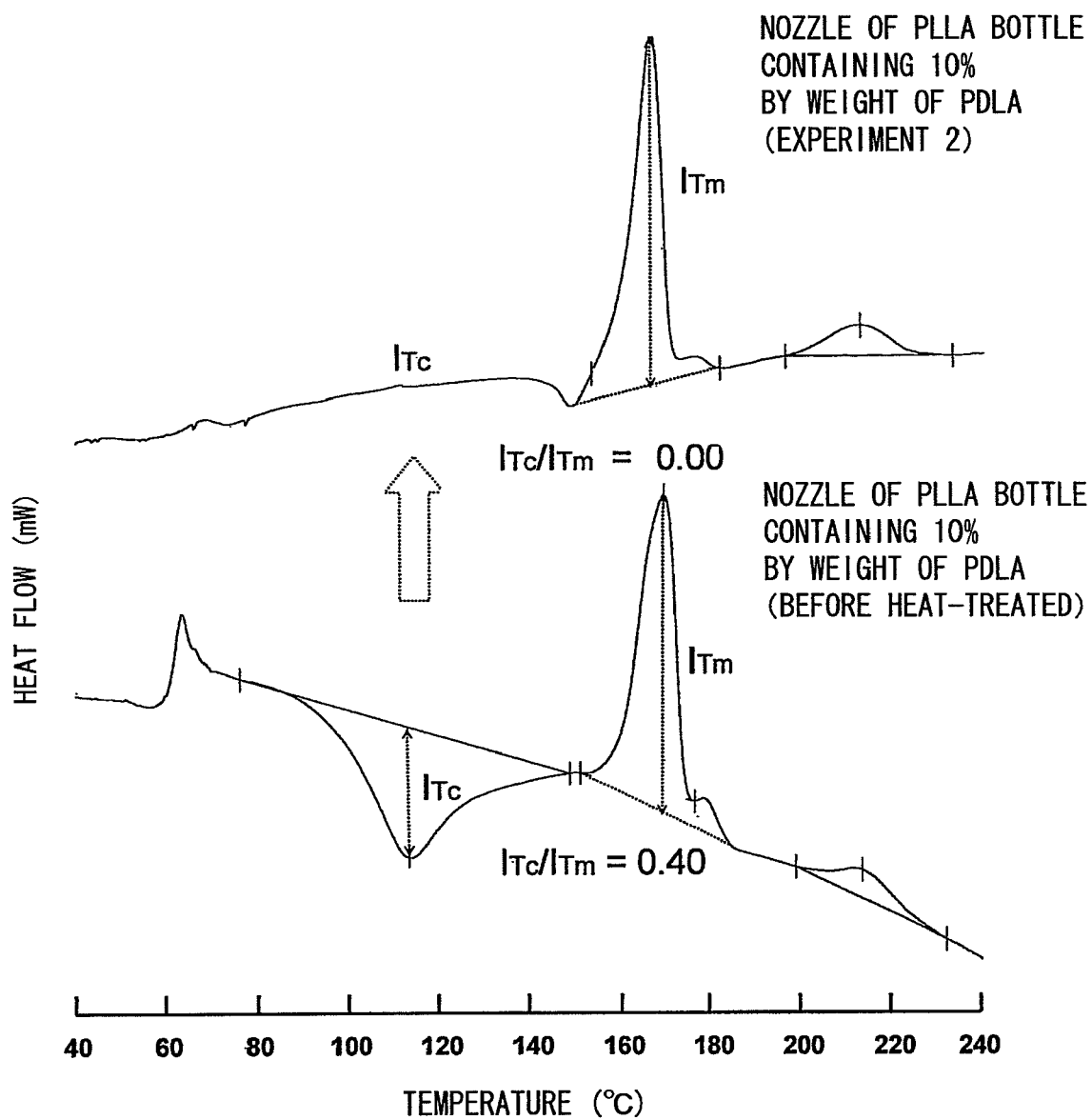

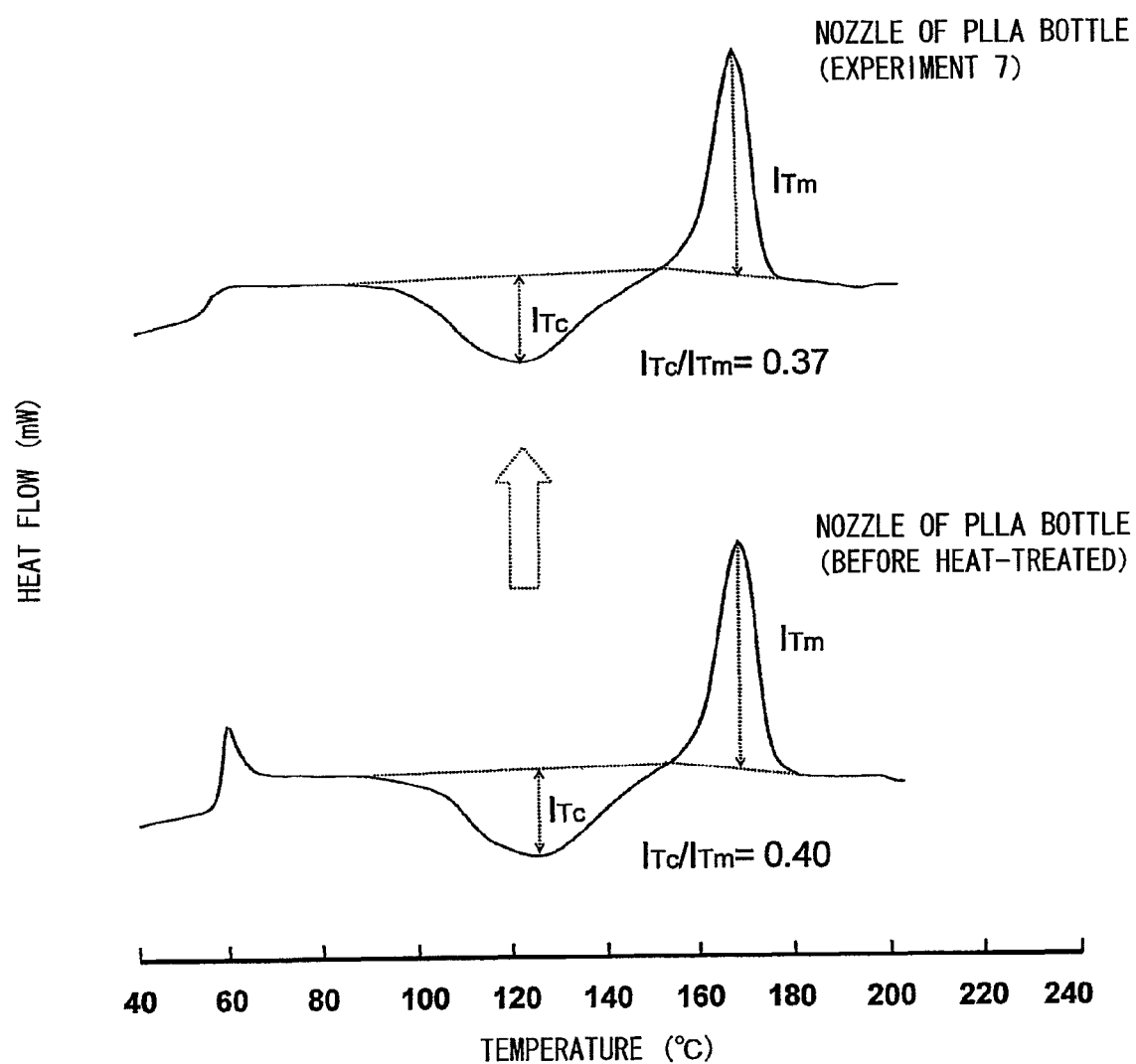

BIODEGRADABLE STRETCH MOLD CONTAINER HAVING EXCELLENT HEAT RESISTANCE

TECHNICAL FIELD

This invention relates to a biodegradable stretch mold container. More specifically, the invention relates to a stretch mold container comprising a polylactic acid resin composition capable of forming a stereocomplex crystal structure and having very excellent heat resistance and to a method of producing the same.

BACKGROUND ART

Degradable plastics that decay in natural environment are drawing attention as an ideal way of disposing plastics. Among them, biodegradable plastics have heretofore been used disintegrating by the action of enzymes which the bacteria and true fungi release out of their bodies. Among the biodegradable plastics, aliphatic polyesters and, particularly, polylactic acids have been used, especially, in the field of packages and containers, since they are mass-produced on an industrial scale, are easily available and are environmentally friendly.

The polylactic acid (PLLA) is a resin using grain starches such as of corn as a starting material, and is a polymer using a product of starch fermented with lactic acid or L-lactic acid as a monomer, and is usually produced by a ring-opening polymerization or a direct polycondensation of a lactide which is a dimer thereof. The polymer is decomposed into water and a carbonic acid gas by microorganisms present in the natural world, and is drawing attention as a resin of the type of a completely recyclable system. The polymer, further, has a glass transition point (Tg) of about 60° C. which is close to the Tg of polyethylene terephthalate offering another advantage.

When it is attempted to apply a stretch mold article of polylactic acid to the use of, for example, producing containers for beverages, there still remain several problems that have to be solved. That is, to improve preservability of the content that is filled, it becomes necessary to conduct some form of sterilization by heating or pasteurization. However, the known stretch mold articles made from the polylactic acid lack heat resistance and are subject to be thermally deformed to a considerable degree even through heating at relatively low temperatures such as of washing with hot-water shower at the time of aseptic filling after having been sterilized with a drug.

To solve the above problems, the present inventors have proposed a method of draw-forming a hydroxyalkanoate resin comprising chiefly the polylactic acid followed by heat-setting in order to improve the oriented crystallinity of the formed article and to improve the heat resistance (patent document 1).

As the polylactic acid having improved heat resistance, there has also been known a stereocomplex polylactic acid comprising a poly-L-lactic acid of an L-lactic acid unit only and a poly-D-lactic acid of a D-lactic acid unit only (patent document 2).

Patent document 1: WO2003/008178
Patent document 2: JP-A-2006-36808

DISCLOSURE OF THE INVENTION

When it is attempted to improve the heat resistance by effecting the heat-setting after drawing, the heat resistance can be improved due to the heat-setting of the container body that is drawn and oriented. It is, however, difficult to improve the heat resistance of the nozzle by the heat-setting. That is, the rate of crystallization of the polylactic acid is about one-tenth that of polyethylene terephthalate. Therefore, the nozzle cannot be crystallized by heating unlike that of the conventional polyethylene terephthalate and, accordingly, the nozzle of the container comprising the polylactic acid exhibits the heat resistance of, usually, up to about 55° C. relying upon the glass transition temperature (Tg=58° C.) of the polylactic acid.

Further, when a resin comprising the stereocomplex polylactic acid is to be stretch mold, the poly-D-lactic acid (PDLA) and the poly-L-lactic acid (PLLA) having different optical rotatory powers are melt-mixed together to form a stereocomplex crystal structure comprising an optically active isomer. In this case, the crystal region forming the stereocomplex exhibits improved heat resistance. However, the remaining PLLA without forming the stereocomplex and the PDLA resin component that form a levo-rotary helix structure and a dextro-rotary helix structure, tend to form draw-strained components. Therefore, when the PDLA and the PLLA resin are simply melt-mixed and stretch mold, there is formed a crystal region forming the stereocomplex and exhibiting improved heat resistance while exhibiting a tendency to form draw-strain due to the presence of draw-oriented components of single molecules without forming stereocomplex. When the molten mixture of the PDLA and the PLLA is stretch mold, therefore, it becomes an important factor to thermally relax the draw-strained components formed by the PDLA and the PLLA from the standpoint of obtaining a sufficiently large heat resistance and dimensional stability.

It is, therefore, an object of the present invention to provide a stretch mold container comprising a polylactic acid resin having excellent heat resistance and a method of its production by improving the defects inherent in the conventional technology for imparting heat resistance.

The present inventors have discovered a novel fact in that a resin composition comprising a poly-L-lactic acid and a poly-D-lactic acid but containing, at a small ratio, the poly-D-lactic acid that is capable of forming a stereocomplex, i.e., containing the poly-L-lactic acid at a high ratio, enables even undrawn portions to exhibit a rate of crystallization which is as high as that of, for example, polyethylene terephthalate, and have completed the invention.

According to the present invention, there is provided a stretch mold container comprising a resin composition containing a poly-L-lactic acid (A) and a poly-D-lactic acid (B) at a molar ratio A:B in a range of 95:5 to 60:40, and having an amount of heat shrinkage of 5.0% or less under heat treatment conditions of 65° C.×24 hours.

In the stretch mold container of the present invention, it is desired that:
(1) the resin composition exhibits a semicrystallization time in a range of 1.0 to 600 seconds in an isothermal crystallization method as measured by using a differential scanning calorimeter;
(2) a body of the container and a bottom of the container are heat-set;
(3) a nozzle of the container is heat-crystallized; and
(4) a nozzle wall of the container has a peak ratio R as defined by the following formula, $R$=Peak height of crystallization/Peak height of crystal fusion of PLLA of not larger than 0.3 on a temperature-rising curve as measured by using a differential scanning calorimeter (DSC).

According to the present invention, further, there is provided a method of producing the above stretch mold container including:

preparing a preformed article which comprises a resin composition containing a poly-L-lactic acid (A) and a poly-D-lactic acid (B) at a molar ratio A:B in a range of 95:5 to 60:40, and of which the nozzle portion has been heat-crystallized;

biaxially draw-blow-forming the preformed article; and heat-setting a body and a bottom thereof.

According to the present invention, further, there is provided a method of producing the stretch mold container of claim 1 comprising:

preparing a preformed article which comprises a resin composition containing a poly-L-lactic acid (A) and a poly-D-lactic acid (B) at a molar ratio A:B in a range of 95:5 to 60:40, and of which the nozzle portion has been heat-crystallized; and subjecting the preformed article to a two-stage blow-forming which includes a primary blow-forming step, a heat-shrinking step, secondary blow-forming step and a heat-setting step.

Despite of being made from a polylactic acid resin, the stretch mold container of the present invention exhibits excellent heat resistance and, particularly, very fast heat-crystallization time of a level comparable to that of the polyethylene terephthalate. So far, therefore, it was industrially impossible to crystallize the nozzle portion of a stretch mold container made from a polylactic acid resin of poly-L-lactic acid since an extended period of time was required for the crystallization in the step of crystallizing the nozzle. According to the present invention, on the other hand, the nozzle such as a neck (nozzle) of, for example, a bottle can be heat-crystallized and, therefore, making it possible to effect the hot-water shower/rinsing at the time of aseptic filling. Therefore, the stretch mold container of the present invention can also be used as a container for beverages that require sterilization.

Owing to the heat-crystallization of the nozzle and the heat-setting of the body and the bottom, furthermore, the container as a whole exhibits a higher heat resistance than that of the conventional containers comprising a polylactic acid, and makes it possible to form an inorganic vacuum deposited film thereon maintaining stability in the step where heat resistance is required, such as in the step of inorganic vacuum evaporation carried out in an attempt to improve gas-barrier property. Therefore, a container made from a polylactic acid is provided featuring both heat resistance and gas-barrier property.

According to the method of producing the stretch mold container of the present invention, further, it is made possible to effectively relax the draw strain produced at the time of draw-forming the resin composition that contains the poly-L-lactic acid (A) and the poly-D-lactic acid (B) and, therefore, to produce a stretch mold container having excellent heat resistance and dimensional stability.

BRIEF DESCRIPTION OF THE DRAWINGS

FIG. 2 is a diagram showing temperature-rising curves of the bottles formed in Experiment 2 in measuring differential scanning calorific values of the nozzles of the bottles of before being crystallized and after being crystallized.

FIG. 3 is a diagram showing temperature-rising curves of the bottles formed in Experiment 7 (Comparative Example) in measuring differential scanning calorific values of the nozzles of the bottles of before being crystallized and after being crystallized.

BEST MODE FOR CARRYING OUT THE INVENTION

Figure 1:
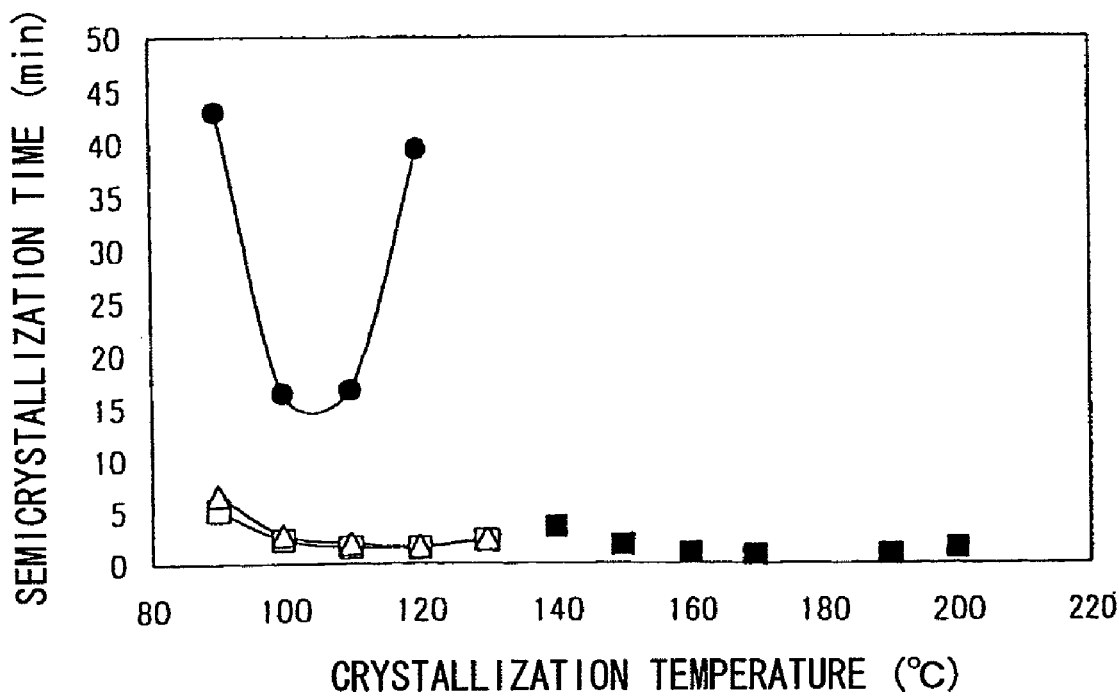
FIG. 1 is a diagram showing semicrystallization times of a poly-L-lactic acid (d %=1.5%), a resin composition containing the poly-L-lactic acid (A) and a poly-D-lactic acid (B) at a molar ratio A:B in a range of 95:5 to 60:40, and polyethylene terephthalate in an isothermal crystallization method.

According to the present invention, an important feature resides in that a stretch mold container is formed by using a resin composition containing a poly-L-lactic acid (A) and a poly-D-lactic acid (B) at a molar ratio A:B in a range of 95:5 to 60:40 and, particularly, 94:6 to 70:30, and has an amount of heat shrinkage of 5.0% or less under heat treatment conditions of 65° C.×24 hours.

As described above, the poly-L-lactic acid, usually, has a low rate of crystallization and is not capable of forming a preform having a nozzle that is heat-crystallized and, therefore, is not capable of improving the heat resistance of the container made from the polylactic acid. According to the present invention, on the other hand, even when the poly-L-lactic acid and the poly-D-lactic acid are used at such a molar ratio that the poly-L-lactic acid is in an excess amount as described above, a high-order structure (stereocomplex) works as a crystal nucleating agent offering such an advantage that the rate of crystallization is quickened as compared to that of the traditionally used polylactic acid resin.

This is also apparent from FIG. 1 which shows semicrystallization times of a poly-L-lactic acid (d %=1.5%), a resin composition containing the poly-L-lactic acid (A) and a poly-D-lactic acid (B) used in the invention at the molar ratio described above, and polyethylene terephthalate in an isothermal crystallization method.

That is, it will be learned that the poly-L-lactic acid (d %=1.5%) that has heretofore been used for forming containers has a semicrystallization time longer than that of polyethylene terephthalate while the resin composition containing the poly-L-lactic acid (A) and the poly-D-lactic acid (B) at a predetermined ratio used in the present invention has a semi-crystallization time nearly the same as that of polyethylene terephthalate.

In the case of the stretch mold container of the present invention, therefore, the nozzle of the preform can be heat-crystallized in advance like the case of polyethylene terephthalate. Namely, the heat resistance of the nozzle of the container, which was a problem so far, can be markedly improved, and a stretch mold container is provided featuring markedly improved heat resistance inclusive of heat resistance at the nozzle of the container. That is, if the ratio of amounts of the poly-L-lactic acid and the poly-D-lactic acid lies outside the above range, e.g., if the two are mixed together each in an equal amount, the crystallization proceeds at the time of being heated again, and there is obtained a resin composition that cannot be favorably stretch mold.

Here, as described earlier, the resin composition containing the poly-L-lactic acid (A) and the poly-D-lactic acid (B) at the above molar ratio tends to produce draw strain in the amorphous region and, therefore, to develop heat shrinkage due to the fact that the resin composition is a mixture of the poly-D-lactic acid and the poly-L-lactic acid having different optical rotatory powers.

According to the present invention, therefore, it is attempted to relax the heat strain in the step of draw-forming, and the heat-setting is effected after the draw-forming, or the two-stage blow-forming is employed to relax the draw strain produced by the draw-forming, making it possible to provide a stretch mold container having suppressed heat shrinkage, i.e., having an amount of heat shrinkage of 5.0% or less under the heat treatment conditions of 65° C.×24 hours.

(Polylactic Acid Resin Composition)

The resin composition used in the invention contains the poly-L-lactic acid (A) and the poly-D-lactic acid (B) at a molar ratio A:B of 95:5 to 60:40 and, particularly, 94:6 to 70:30. If the content of the poly-L-lactic acid (A) is smaller than the above range, the biodegradable property becomes poor. If the content of the poly-D-lactic acid (B) is smaller than the above range, on the other hand, the rate of crystallization of the nozzle of the preform cannot be improved to a degree that the nozzle can be heat-crystallized, and the heat resistance cannot be improved.

As described above, it is desired from the standpoint of heat resistance that the resin composition used in the present invention exhibits an improved rate of crystallization as compared to that of 100% poly-L-lactic acid or 100% poly-D-lactic acid, and has a semicrystallization time in a range of 1.0 to 600 seconds and, particularly, 20 to 180 seconds in the isothermal crystallization method as measured by using a differential scanning calorimeter.

The lactic acid unit has a basic constituent unit of the following formula (1),

$$-[-OCH-CO(CH_3)-]-\qquad(1)$$

The poly-L-lactic acid (A) is constituted by an L-lactic acid unit, a D-lactic acid unit and/or a copolymerizable component unit other than the D-lactic acid unit, and contains the L-lactic acid unit in a range of 90 to 99 mol %, while the poly-D-lactic acid (B) is constituted by a D-lactic acid unit, an L-lactic acid unit and/or a copolymerizable component unit other than the L-lactic acid unit, and contains the D-lactic acid unit in a range of 80 to 99 mol %.

As the copolymerizable component units other than the D-lactic acid unit and the L-lactic acid unit, there are used units stemming from dicarboxylic acid having two or more functional groups capable of forming an ester bond, polyhydric alcohol, hydroxycarboxylic acid and lactone, as well as units stemming from various polyesters comprising various constituent components, various polyethers and various polycarbonates, alone or being mixed together. From the standpoint of formability, it is desired that the poly-L-lactic acid has a weight average molecular weight (Mw) in a range of 100,000 to 300,000 while the poly-D-lactic acid has a weight average molecular weight (Mw) in a range of 50,000 to 300,000.

In the resin composition used in the present invention, the poly-L-lactic acid (A) and the poly-D-lactic acid (B) are blended at the above molecular ratio to form a stereocomplex crystal structure. When prepared by blending, the stereocomplex structure is formed by heating, melting and mixing them together at a temperature in a range of 170 to 250° C.

By using a master batch obtained by melt-blending or copolymerizing the poly-L-lactic acid (A) and the poly-D-lactic acid (B) at a predetermined ratio in advance, further, a resin composition capable of forming the stereocomplex crystal structure can also be prepared by melt-mixing the master batch with the poly-L-lactic acid (A).

The above resin composition should be avoided from being subjected to a thermal hysteresis of not lower than 260° C. If heated at such a high temperature, the poly-L-lactic acid and the poly-D-lactic acid are thermally decomposed resulting in a decrease in the properties, such as an increased shrinkage ratio.

The resin composition used in the present invention may be blended with various coloring agents, inorganic or organic reinforcing agent, lubricant, plasticizer, leveling agent, surfactant, viscosity-imparting agent, viscosity-decreasing agent, stabilizer, antioxidant, ultraviolet ray absorber and rust preventive depending upon the use according to a known recipe.

In the resin composition used in the present invention, further, the stereocomplex crystal structure works as a crystal nucleating agent contributing to improving the rate of crystallization. Therefore, though not necessarily needed, it is also allowable to add an inorganic filler such as talc, kaolin clay or kaolinite, a heterocyclic compound constituted by hydrogen, halogen and hydroxy, or an amide compound selected from chain-like amide, cyclic amide, chain-like hydrazide or cyclic hydrazide.

It is desired that the amount of blending the inorganic filler is, usually, in a range of 0.5 to 40% by weight and, particularly, 1 to 28% by weight.

It is desired that the resin composition used in the invention comprises the poly-L-lactic acid (A) and the poly-D-lactic acid (B) only as the resin components but may, further, be blended with a resin that contains other aliphatic polyesters or other resins as resin components within a range which does not spoil excellent heat resistance obtained by the polylactic acids capable of forming the stereocomplex crystal structure. In this case, it is desired that the content of the other aliphatic polyester or the other resin is not larger than 20% by weight in the resin composition.

As the other resins that can be added to the above resin composition, there can be exemplified a hydroxyl group-containing thermoplastic resin exhibiting barrier property against oxygen, nylon resin, aliphatic polyester resin having barrier property, as well as various barrier resins, such as polyester resin comprising two or more kinds of dicarboxylic acids, high nitrile resin, and cyclic olefin copolymer exhibiting barrier property against water vapor.

Among them, the hydroxyl group-containing resin and the aliphatic polyester are preferred from the standpoint of biodegrading property. In the case of the hydroxyl group-containing resin, any resin can be used so far as it can be heat-formed. The resin has, in the molecular chain thereof, a recurring unit having a hydroxyl group and a unit that imparts heat-formability to the resin. The hydroxyl group-containing recurring unit may be a vinyl alcohol unit or a hydroxyalkyl (meth)acrylate unit. From the standpoint of biodegrading property, however, the vinyl alcohol unit is preferred. Other units contained in the hydroxyl group-containing resin may be an olefin unit such as ethylene or propylene, a vinyl ester unit such as vinyl acetate, and alkyl(meth)acrylate unit. The hydroxyl group-containing resin should have a molecular weight large enough for forming, at least, a film.

(Method of Producing Stretch Mold Containers)

The stretch mold container of the present invention can be obtained by biaxially draw-blow-forming a preform which comprises the above-mentioned resin composition and of which the nozzle such as the neck including a threaded portion and a support ring has been heat-crystallized.

It is desired that the preform has a single-layer structure comprising the above resin composition only but, depending upon the cases, may have a laminated layer structure thereof with the layer of the above-mentioned barrier resin. There is no particular limitation on means for forming the preform; i.e., the preform can be formed relying on a conventional injection-forming or compression-forming.

The nozzle of the preform that is formed can be heat-crystallized by heating by being irradiated with infrared rays from the outer side of the nozzle in a manner that the temperature on the outer wall of the nozzle becomes 90° C. to 160° C. for a short period of time of 100 to 360 seconds and, particularly, 120 to 300 seconds. If the heating temperature is lower than the above range or the heating time is shorter than the above range, the nozzle cannot be heat-crystallized to a sufficient degree. If the heating temperature is higher than the above range or the heating time is longer than the above range, the nozzle may undergo deformation which is not desirable. The heating system may be a conventional means, such as infrared-ray heating, hot air heating, or radio frequency induction heating, being used alone or in a suitable combination to efficiently heat the nozzle only in a short period of time.

In heating the nozzle, further, it is desired to effect the inner diameter sizing by inserting a jig in the nozzle in order to prevent a drop in the dimensional stability of the nozzle that stems from the softening and deformation of the resin.

The preform that is formed is heated to a drawing temperature of 80 to 120° C. prior to being subjected to the draw-blow forming. The preform that is uniformly heated at a high temperature is formed by the conventional biaxial draw-blow-forming. Forming the preform and the draw-blow-forming thereof can also be applied to the hot parison system which effects the draw-blow-forming without completely cooling the preform in addition to being applied to the cold parison system.

The preform is fed into a known draw-blow-forming machine, set in a metal mold, drawn in the axial direction by pushing a stretching rod therein, and is stretch mold in the circumferential direction by blowing a fluid. The metal mold temperature is, usually, in a range of 75 to 150° C. When the preform is to be heat-set in the blow-forming metal mold as will be described below, however, it is desired to set the metal mold temperature to 80 to 120° C.

The drawing ratio of the finally stretch mold container is desirably 4 to 9 times in terms of the area ratio, wherein it is desired that the drawing ratio in the axial direction is 1.5 to 3.0 times and the drawing ratio in the circumferential direction is 1.5 to 3.0 times.

It is desired that the stretch mold container of the invention is subjected to the heat-setting after draw-forming in order to relax the draw strain that stems from the stereocomplex crystal structure. The heat-setting can be effected in the blow-forming metal mold or in a metal mold for heat-setting different from the blow-forming metal mold.

From the standpoint of relaxing the draw-forming strain that stems from the complex crystal structure, it is desired that the stretch mold container of the present invention is formed by employing, particularly, a two-stage blow-forming method as the biaxial draw-blow-forming.

The two-stage blow-forming method includes a primary blow-forming step for forming a secondarily formed article by primarily blow-forming the preform heated at a drawing temperature in a primary blowing metal mold, a heat-shrinking step for obtaining a tertially formed article by heat-shrinking at least the bottom of the secondarily formed article, and a secondary blow-forming step for secondarily blow-forming the tertiary formed article in a secondary blowing metal mold.

In the two-stage blow-forming method, the draw-blow-forming is effected being divided into two stages. Therefore, the drawing is effected in large amounts by the primary blow-forming to accomplish a high degree of drawing and orientation while relaxing the draw strain through the heat-shrinking step. Moreover; since the working rate is restrained on the second stage of blow-forming in the tertiary formed article that has been heat-shrunk, it is allowed to decrease the residual strain. Besides, upon effecting the heat-setting after the blow-formings in the first stage and the second stage, a high degree of crystallinity is imparted to the formed article to further improve the heat resistance.

The two-stage blow-forming, too, can be conducted under the known conditions and, preferably, the area-drawing ratio in the primary blow-forming step is 4.0 to 16.0 times and, particularly, the ratio in the longitudinal direction is 2.0 to 4.0 times and the ratio in the circumferential direction is in a range of 2.0 to 4.0 times. The working rate in the secondary blow-forming step is such that a difference in the volume between the final shape of the container and the tertiary formed article that is heat-shrunk is not larger than 50% of the volume of the final shape.

The heat treatment condition in the heat-shrinking step can be suitably determined, usually, from the temperature of 90 to 190° C. and the treating time of 0.5 to 60 seconds though it may vary depending upon the conditions of the primary blow-forming.

Further, the stretch mold container of the present invention may be formed by a known compressed air-forming or plug-assisted forming in addition to the one formed by the above-mentioned biaxial draw-blow-forming.

That is, a preformed article such as a sheet that has been heat-crystallized by heating a portion that turns into a flange, is heated, held by a clamp, pushed by a plug so as to be drawn in the axial direction, drawn in the circumferential direction by blowing a pressurized fluid, and is heat-set by the conduction of heat from the metal mold. The conditions such as heating the flange portion, drawing temperature, heat-setting temperature and drawing ratio may comply with the conditions of the biaxial draw-blow forming.

(Stretch Mold Containers)

The stretch mold container of the present invention formed by the above method has the nozzle that is heat-crystallized. If the nozzle wall is measured by using a differential scanning calorimeter (DSC), a peak ratio defined by the following formula, $$R=X/Y$$

wherein X represents Peak height of crystallization, and Y means Peak height of crystal fusion of PLLA, is not larger than 0.3, particularly, not larger than 0.25 and, most desirably, is substantially zero on a temperature-rising curve thereof. That is, if the nozzle wall of the preform before being heat-crystallized is measured by using the DSC, a peak of crystallization appears on a temperature-rising curve thereof in a region near 113° C., a peak of crystal fusion of the poly-L-lactic acid (PLLA) appears near 170° C., and a peak of crystal fusion of the stereocomplex appears near 213° C. On the other hand, when the container of the present invention is measured for its nozzle wall by using the DSC, the peak of crystal fusion of the PLLA and the peak of crystal fusion of the stereocomplex appear similarly to those of the nozzle wall of the preform of before being heat-crystallized, but the peak of crystallization is very decreased since the wall has been crystallized already and the peak ratio R assumes a very small value as described above (zero depending upon the cases). That is, the smaller the peak ratio R, the larger the degree of crystallization of the nozzle wall. In the container of the present invention, the nozzle is crystallized as described above. Therefore, the nozzle does not deform even if the nozzle is fixed by using a chuck (fastening force of about 15 to 50 N) in the step of washing the bottles with hot water of, for example, 65° C. Besides, the body and the bottom have been draw-oriented and heat-set, and, therefore, have a very high heat resistance, effectively suppressing the amount of heat shrinkage to be 5.0% or less and, particularly, 1.0% or less under heat treatment conditions of 65° C.×24 hours.

Therefore, the stretch mold container of the present invention can withstand the sterilization for aseptic filling in which the container is washed with the shower of hot water heated at not lower than 65° C. after the sterilization with a drug, and can, therefore, be used as a container for beverages.

Not being limited thereto only, the stretch mold container of the present invention, usually, has the shape of a bottle when formed by the biaxial draw-blow forming, and has the shapes of cup or tray when formed by heat-forming such as compressed-air forming. In the case of cups and trays, the circumferential flange portions have been heat-crystallized.

EXAMPLES

Next, the present invention will be described by way of Experiments. Here, it should be noted that the present invention is in no way limited to the contents of Experiments only.
(Resins)
A poly-L-lactic acid resin having a weight average molecular weight (Mw) of 200,000 and an optically active isomer (d) ratio of 1.5% (manufactured by Nature Work Co.) and a poly-D-lactic acid resin having an average molecular weight (Mw) of 250,000 and an optically active isomer (d) ratio of 99.0% (manufactured by PURACK Co.) were dry-blended together at ratios shown in Table 1 to obtain resin compositions.
(Forming Bottles)
Preparation of Preforms:
By using resin compositions shown in Table 1, preforms having a nozzle diameter of 35 mmΦ were prepared by injection-forming by using an injection-forming machine under a temperature condition of 190° C. to 240° C. and a metal mold temperature of 15° C.
Crystallization of Nozzle of Preforms:
The nozzle only of preforms were selectively irradiated with infrared rays and blown with the hot air so that the temperature on the outer walls of the nozzles (nozzles) were heated at 160° C. for 2.5 minutes and that the nozzles were heated and softened. Thereafter, a nozzle inner-diameter jig made of Teflon was inserted therein to effect the inner diameter sizing.
One-Stage Draw-Blow Forming:
The preform of which the nozzle has been heat-crystallized was heated again at 90° C. by using an infrared-ray heater, drawn at an area-drawing ratio of 4 to 9 times by using a blow-forming machine with a metal mold heated at 85° C. and was heat-set in the metal mold to prepare a bottle having a volume of 300 ml and an average thickness of 300 μm.
Two-Stage Draw-Blow Forming:
The above preform was heated at 90° C. by using a first infrared-ray heater, drawn at an area-drawing ratio of 4 to 16 times by using a metal mold blow-forming machine, heat-shrunk at a temperature of up to 160° C. (upper limit) by using a second infrared-ray heater, and was heated in a temperature range of 90° C. by using a third infrared-ray heater to draw-blow-form a bottle of a volume of 300 ml by using the blow-forming machine with the metal mold heated at 85° C.
(Evaluation)
Rate of Isothermal Crystallization:
By using a differential scanning calorimeter (DSC) manufactured by Perkin-Elmer Co., the samples to be measured were heated at 200° C., cooled down to a temperature for measuring isothermal crystallization (constant temperature in a range of 70° C. to 130° C.), set to assume a constant temperature, and were found for their peaks of calorific values that accompany the crystallization.
Measurement of Differential Scanning Calorific Values:
Samples (about 10 mg) cut from the bottle nozzle of before being crystallized, cut from the bottle nozzle of after being crystallized of Experiment 2, and cut from the bottle nozzle of before being crystallized and cut from the bottle nozzle of after being crystallized of Experiment 7, were measured at a temperature-rising rate of 10° C./mm by using the differential scanning calorimeter (DSC) manufactured by Perkin-Elmer Co. From a DSC chart, a peak height (ITc) was found between a peak top of crystal calorific value occurring in a temperature region of not lower than 80° C. but not higher than 150° C. and a baseline tangent. Further, a peak height (ITm) was found between a peak top of crystal fusion occurring in a temperature region of not lower than 150° C. but not higher than 180° C. and the baseline tangent. The amount of the formed crystals was evaluated from the following formula (1), $$R = \text{Peak intensity ratio } (ITc/ITm) \quad (1)$$
$$= \frac{\text{Peak height of crystal calorific value } (ITc)}{\text{Peak height of crystal fusion } (ITm)}$$

The obtained peak intensity ratios (ITc/ITm) were as shown in the drawings.
Heat-Shrinkage:
By using tap water of 20° C., a bottle was measured for its full-filled content. The bottle was left to stand upright in a constant temperature oven maintained at 65° C. for 24 hours. After left to stand, the bottle was measured again for its full-filled content. A rate of heat shrinkage was found from a difference in the full-filled content of before and after being left to stand in the constant temperature oven.
Heat-Resistance of Bottles:
The nozzle of the bottle in an upside-down state was held by a gripper. A hot-water shower nozzle was inserted in the nozzle, and hot water of 65° C. was injected into the inner surface of the bottle for 60 seconds to wash the bottle with the shower of hot water. In case the nozzle was deformed or the bottle was deformed after washed with the shower of hot water, the bottle was evaluated to be X. If the nozzle or the bottle was not deformed, the bottle was evaluated to be ○.
(Experiments 1 to 3)
Preforms were formed by injection-forming the resin compositions shown in Table 1, the nozzle of the preforms were heat-crystallized by the above-mentioned method, and bottles were formed through the above-mentioned one-stage draw-blow-forming method. The results were as shown in Table 1.
The bottles formed in Experiment 2 were measured for their differential scanning calorific values at the bottle nozzles of before being crystallized and at the bottle nozzle of after being crystallized to draw temperature-rising curves as shown in FIG. 2 and from which the respective peak intensity ratios (ITc/ITm) were found as shown in FIG. 2.
(Experiments 4 to 6)
Preforms were formed by injection-forming the resin compositions shown in Table 1, the nozzles of the preforms were heat-crystallized by the above-mentioned method, and bottles were formed through the above-mentioned two-stage draw-blow-forming method. The results were as shown in Table 1.
(Experiments 7 and 8)
The procedure was conducted in the same manner as in Experiment 1 but using the resin compositions shown in Table 1 as resin compositions. The results were as shown in Table 1.
The bottles formed in Experiment 7 were measured for their differential scanning calorific values at the bottle nozzles of before being crystallized and at the bottle nozzles of after being crystallized to draw temperature-rising curves as shown in FIG. 3 and from which the respective peak intensity ratios (ITc/ITm) were found as shown in FIG. 3.
(Experiment 9)
The procedure was conducted in the same manner as in Experiment 2 but without heat-crystallizing the nozzle of the preform. The results were as shown in Table 1.
(Experiment 10)
The procedure was conducted in the same manner as in Experiment 2 but setting the metal mold temperature to be 50° C. The results were as shown in Table 1.

TABLE 1

| PLLA/PDLA resin composition | Exp. 1 | Exp. 2 | Exp. 3 | Exp. 4 | Exp. 5 | Exp. 6 | Exp. 7 | Exp. 8 | Exp. 9 | Exp. 10 |
|---|---|---|---|---|---|---|---|---|---|---|
| PLLA | 95 | 90 | 85 | 95 | 90 | 85 | 100 | 0 | 90 | 90 |
| PDLA | 5 | 10 | 15 | 5 | 10 | 15 | 0 | 100 | 10 | 10 |
| Nozzle crystallized | yes | yes | yes | yes | yes | yes | yes | yes | no | yes |
| Blow-forming one stage/two stages | one | one | one | two | two | two | two | two | two | two |
| Temp. of blow metal mold (° C.) | 85° C. | 85° C. | 85° C. | 85° C. | 85° C. | 85° C. | 85° C. | 85° C. | 85° C. | 50° C. |
| Semicrystallization time (min at 110° C.) | 2.1 | 1.5 | 0.6 | 2.1 | 1.5 | 0.6 | 16.4 | 16.7 | 1.5 | 1.7 |
| Rate of heat shrinkage (%) | 1.2 | 1.7 | 2.0 | 1.0 | 0.9 | 0.7 | 1.0 | 1.0 | 1.8 | 8.4 |
| Heat resistance of bottle | ○ | ○ | ○ | ○ | ○ | ○ | x[1] | x[1] | x[1] | x[2] |

[1] nozzle deformed
[2] body deformed

The invention claimed is:

1. A stretch mold container comprising a resin composition containing a poly-L-lactic acid (A) and a poly-D-lactic acid (B) at a molar ratio A:B in a range of 95:5 to 60:40, and having an amount of heat shrinkage of 5.0% or less under heat treatment conditions of 65° C.×24 hours.

2. The stretch mold container according to claim 1, wherein a body of the container and a bottom are heat-set.

3. The stretch mold container according to claim 1, wherein the resin composition exhibits a semicrystallization time in a range of 1.0 to 600 seconds in an isothermal crystallization method as measured by using a differential scanning calorimeter.

4. The stretch mold container according to claim 1, wherein a nozzle of the container is heat-crystallized.

5. The stretch mold container according to claim 4, wherein a nozzle wall of the container has a peak ratio R as defined by the following formula, $R$ = Peak height of crystallization/Peak height of crystal fusion of PLLA of not larger than 0.3 on a temperature-rising curve as measured by using a differential scanning calorimeter (DSC).

6. A method of producing the stretch mold container of claim 1 including:
preparing a preformed article which comprises a resin composition containing a poly-L-lactic acid (A) and a poly-D-lactic acid (B) at a molar ratio A:B in a range of 95:5 to 60:40, and of which the nozzle portion has been heat-crystallized;
biaxially draw-blow-forming the preformed article; and
heat-setting a body and a bottom thereof.

7. A method of producing the stretch mold container of claim 1 comprising:
preparing a preformed article which comprises a resin composition containing a poly-L-lactic acid (A) and a poly-D-lactic acid (B) at a molar ratio A:B in a range of 95:5 to 60:40, and of which the nozzle portion has been heat-crystallized; and
subjecting the preformed article to a two-stage blow-forming which includes a primary blow-forming step, a heat-shrinking step, secondary blow-forming step and a heat-setting step.

* * * * *